United States Patent [19]

Abe et al.

[11] Patent Number: 5,439,865
[45] Date of Patent: Aug. 8, 1995

[54] CATALYST FOR EXHAUST GAS PURIFICATION AND PROCESS FOR PRODUCTION THEREOF

[75] Inventors: Fumio Abe, Handa; Naomi Noda, Ichinomiya; Makoto Hori; Toshimi Fukui, both of Kitakyushu, all of Japan

[73] Assignees: NGK Insulators, Ltd.; Krosaki Corporation, both of Japan

[21] Appl. No.: 59,595

[22] Filed: May 12, 1993

[30] Foreign Application Priority Data

Jul. 30, 1992 [JP] Japan .................. 4-203791

[51] Int. Cl.⁶ .................... B01J 21/04; B01J 23/40
[52] U.S. Cl. ........................ 502/333; 502/302; 502/303; 502/304; 502/334; 502/339; 502/355
[58] Field of Search ............... 502/304, 303, 302, 333, 502/334, 339, 355

[56] References Cited

U.S. PATENT DOCUMENTS

| | | | |
|---|---|---|---|
| 3,441,381 | 4/1969 | Keith et al. | 23/288 |
| 3,441,382 | 4/1969 | Keith et al. | 23/288 |
| 4,123,391 | 10/1978 | Noguchi et al. | 252/466 PT |
| 4,331,565 | 5/1982 | Schaefer et al. | 252/462 |
| 4,587,231 | 5/1986 | Sawamura et al. | 502/304 |
| 4,708,946 | 11/1987 | Ohata et al. | 502/304 |
| 4,843,056 | 6/1989 | Matsumoto et al. | 502/302 |
| 4,868,149 | 9/1989 | Kricker | 502/303 |
| 4,888,320 | 12/1989 | Ihara et al. | 502/304 |
| 4,929,406 | 5/1990 | Abe et al. | 264/45.5 |
| 4,971,696 | 11/1990 | Abe et al. | 210/500.25 |
| 4,985,387 | 1/1991 | Prigent et al. | 502/304 |
| 5,013,705 | 5/1991 | Korberstein et al. | 502/303 |
| 5,081,095 | 1/1992 | Bedford et al. | 502/304 |
| 5,210,062 | 5/1993 | Narula et al. | 502/304 |
| 5,254,516 | 10/1993 | Gupta et al. | 502/84 |

FOREIGN PATENT DOCUMENTS

| | | |
|---|---|---|
| 0427494A2 | 5/1991 | European Pat. Off. . |
| 1476505 | 7/1969 | Germany . |
| 1476507 | 12/1970 | Germany . |
| 3223500A1 | 12/1983 | Germany . |
| 3806960A1 | 9/1988 | Germany . |
| 3147110C2 | 11/1988 | Germany . |
| 3835184A1 | 5/1989 | Germany . |
| 3806960C2 | 9/1990 | Germany . |
| 3223500C2 | 1/1992 | Germany . |
| 3826155C2 | 1/1992 | Germany . |
| 3835184C2 | 1/1992 | Germany . |
| 60-25544 | 2/1985 | Japan . |
| 4-48932 | 2/1992 | Japan . |
| 648059 | 2/1979 | U.S.S.R. . |
| 649455 | 3/1979 | U.S.S.R. . |

OTHER PUBLICATIONS

Y. Mizushima and M. Hori, "Preparation of Alumina Aerogel Through Sol–Gel Method and Application to Catalytic Support", p. 172. (1990) Ceramic Soc. Japan.

Y. Mizushima and M. Hori, "Preparation and Sintering Behavior of Alumina Aerogel", p. 277. (1988) Ceramic Soc. Japan.

*Primary Examiner*—Anthony McFarlane
*Attorney, Agent, or Firm*—Parkhurst, Wendel & Rossi

[57] ABSTRACT

A catalyst for exhaust gas purification, comprising a heat-resistant inorganic monolith carrier and a catalyst layer loaded thereon, the catalyst layer including a catalyst composition containing at least one noble metal selected from Pt, Pd and Rh, as an active catalyst component, and active alumina. The catalyst composition has a specific surface area of at least 50 $m^2/g$ and a porosity of at least 50%. This catalyst for exhaust gas purification contains noble metal(s) in a well dispersed state, has excellent high-temperature durability, and is low in thermal deterioration of catalyst performance. Hence, the catalyst can be suitably used as a converter installed in engine manifolds of gasoline engine automobiles, or as a heater having improved purification ability for the exhaust gases emitted from automobiles during their cold start.

37 Claims, No Drawings

CATALYST FOR EXHAUST GAS PURIFICATION AND PROCESS FOR PRODUCTION THEREOF

BACKGROUND OF THE INVENTION AND RELATED ART

The present invention relates to catalysts for exhaust gas purification and processes for producing the catalysts. More particularly, the present invention relates to catalysts for exhaust gas purification, which can be suitably used as a converter installed in engine manifolds of gasoline engine automobiles and which are to have high heat resistance. Also, the present catalyst may be used as a heater having improved purification ability For the exhaust gases emitted from automobiles during their cold start, as well as to processes for producing the catalysts.

Various proposals have hitherto been made for catalysts for exhaust gas purification used in the internal combustion engines of automobiles, etc. The heat resistance requirements for the catalysts have increasingly become higher because the catalysts are used at fairly high temperatures and because, in recent years, it has been attempted to provide a catalyst in the vicinity of manifold for improvement of warm-up property of catalyst or to use an electrically-heated catalyst for improved purification of exhaust gas during cold start.

this connection, catalysts were proposed in which $\sigma$-alumina or $\theta$-alumina is used as a carrier in place of the conventional, $\gamma$-alumina of wide use to suppress the thermal deterioration of catalyst performance caused by $\alpha$ transformation of alumina under heated conditions. Meanwhile, in the field of catalytic combustion wherein catalysts must have high-temperature durability, there were proposed, for example, an alumina aerogel and/or a metal-loaded alumina aerogel by sol-gel method followed by supercritical drying.

For example, Japanese Patent Application Kokai (Laid-Open) No. 25544/1985 discloses, as a catalyst for purification of automobile exhaust gases, mainly intended for the prevention of thermal deterioration, a catalyst for exhaust gas purification comprising (1) a carrier, at least the surface layer of which is made from $\delta$-alumina, $\theta$-alumina or a mixture thereof and (2) an active catalyst component loaded thereon. This catalyst is obtained by coating $\delta$-alumina, $\theta$-alumina or a mixture thereof (obtained by firing ordinary $\gamma$-alumina at 850°–1,050° C.) on a cordierite monolith carrier and then impregnating the resulting material with an aqueous solution of a noble metal and/or cerium to allow the material to support the noble metal and/or cerium.

Further, Japanese Patent Application Kokai (Laid-Open) No. 48932/1992 discloses, as a process for producing a platinum-loaded porous gel by Finely and uniformly dispersing platinum in an aerogel without cracking and shrinkage of the aerogel, a process which comprises hydrolyzlng a metal alkoxide solution with chloroplatinic acid and base(s) capable of forming a complex to chloroplatinic acid, of an amount of 0.1–10 moles ratio chloroplatinic acid.

The result of the performance evaluation of such a catalyst metal-loaded aerogel is shown in the page 172 of Preprint for Annual Meeting (1991) of the Ceramic Society of Japan, i.e. "Preparation of alumina aerogel through sol-gel method and application to catalytic support" by Yasuyuki MIZUSIIIMA and Makoto HORI (Colloid Research Institute). The article reports the evaluation result on the methane-oxidizing activity of a catalyst metal-loaded aerogel obtained by hydrolyzing an aluminum alkoxide, adding thereto 1% by weight of Pd in the form of an aqueous chloride solution, allowing the mixture to cause gelation, and subjecting the gel to supercritical drying. In the article, there is shown a comparative test result when a Pd-loaded aerogel obtained by adding 1% by weight of Pd to a sol as mentioned above and a commercial alumina carrier impregnated with 1% by weight of Pd were fired at 1,200° C. for 100 hours and then subjected to a methane combustion test. The result shows that loading of Pd on aerogel gives significant improvement in catalytic activity.

Similarly, in the page 29 of Preprint for Annual Meeting (1990) of the Ceramic Society of Japan, i.e. the presentation No. 1B10 "Preparation and Sintering Behavior of Alumina Aerogel" by Yasuyuki MIZUSHIMA and Makoto HORI (Colloid Research Institute), there is reported a result when an aerogel obtained by hydrolyzing an aluminum alkoxide, allowing the resulting material to cause gelation and subjecting the gel to drying under a supercritical condition of $CO_2$ or ethanol, is fired at various temperatures ranging from 800° to 1,600° C. and is then measured for specific surface area. According to the result, the aerogel obtained as above, as compared with a xerogel (used for comparison) obtained by normal-pressure drying, maintains a high specific surface area even at high temperatures.

In the catalyst For exhaust gas purification according to Japanese Patent Application Kokai (Laid-Open) No. 25544/1985, however, calcination alone of ordinary $\gamma$-alumina is unable to provide a catalyst carrier of high specific surface area and high porosity and consequently the resulting catalyst has insufficient performance.

Also, in the process for producing a platinum-loaded porous gel according to Japanese Patent Application Kokai (Laid-Open) No. 48932/1992, no mention is made on the composition and properties of a catalyst for exhaust gas purification produced from the gel and on the method for preparation of such a catalyst.

In the above two Preprints for Annual Meeting of the Ceramic Society of Japan, i.e. "Preparation of alumina aerogel through sol-gel method and application to catalytic support" and "Preparation and Sintering Behavior of Alumina Aerogel", no mention is made on the composition and structure of a catalyst For automobiles, produced from the aerogel.

The present invention has been made under the above situation and is intended to provide catalysts for purification of automobile exhaust gas, having excellent heat resistance and durability and processes for production of such catalysts, by using a sol-gel method and supercritical drying, and further, by employing a particular composition and structure suitable for catalyst for purification of automobile exhaust gas.

SUMMARY OF THE INVENTION

According to the present invention there is provided a catalyst For exhaust gas purification, comprising a heat-resistant inorganic monolith carrier and a catalyst layer loaded thereon, said catalyst layer comprising a catalyst composition containing at least one noble metal selected from Pt, Pd and Rh, as an active catalyst component, active alumina and, as necessary, rare earth oxide(s), and said catalyst composition having a specific surface area of at least 50 m²/g and a porosity of at least 50%.

In the present invention, the catalyst composition preferably has a pore radius distribution curve having a peak in the range of 50–1,000 Å. Also, the catalyst composition preferably has a specific surface area of at least 100 m²/g and a porosity of at least 70%. The catalyst composition preferably maintains a specific surface area of at least 50 m²/g and a porosity of at least 50% even at a high temperature of 1,000° C.

Further in the present invention, the catalyst composition contains, as a noble metal, at least one combination selected from Pt/Rh, Pd/Rh and Pt/Pd/Rh, and Rh is preferably arranged separately from other noble metals.

According to the present invention there is further provided a catalyst for exhaust gas purification, comprising a heat-resistant inorganic monolith carrier, a first catalyst layer loaded on the carrier and a second catalyst layer loaded on the first catalyst layer, the first catalyst layer being a catalyst composition which is a noble metal consisting of Pt, Pd or a combination thereof, loaded on a carrier substance consisting of active alumina and, as necessary, rare earth oxide(s), and said second catalyst layer being a catalyst composition which is Rh loaded on active alumina.

According to the present invention there are further provided various production processes as described below.

The first process is a process for producing a catalyst for exhaust gas purification, which comprises hydrolyzing an aluminum salt or an aluminum alkoxide derivative to obtain an alumina precursor sol or gel, drying it under a supercritical condition to obtain an alumina porous material, firing the material at a temperature of 500° C. or more to obtain active alumina, adding thereto at least one noble metal selected from Pt, Pd and Rh and, as necessary, rare earth component(s) to obtain a catalyst composition having a specific surface area of at least 50 m²/g and a porosity of at least 50%, and then forming a catalyst layer containing the composition, on a heat-resistant resistant inorganic monolith carrier.

The second process is a process for producing a catalyst For exhaust gas purification, which comprises adding, to an aluminum salt or an aluminum alkoxide derivative, at least one noble metal component selected from Pt, Pd and Rh to obtain a noble metal-dispersed alumina precursor sol or gel, drying the sol or gel under a supercritical condition to obtain a noble metal-dispersed alumina porous material, firing the material at a temperature of 500° C. or more to obtain a noble metal-dispersed active alumina, adding, as necessary, rare earth component(s) to the noble metal-dispersed active alumina to obtain a catalyst composition having a specific surface area of at least 50 m²/g and a porosity of at least 50%, and Forming a catalyst layer containing the catalyst composition, on a heat-resistant inorganic monolith carrier.

The third process is a process for producing a catalyst for exhaust gas purification, which comprises adding rare earth component(s) to an aluminum salt or an aluminum alkoxide derivative to obtain an alumina-rare earth composite precursor sol or gel, drying the sol or gel under a supercritical condition to obtain an alumina-rare earth composite porous material, adding to the material at least one noble metal selected from Pt, Pd and Rh and, as necessary, rare earth component(s) to obtain a catalyst composition having a specific surface area of at least 50 m²/g and a porosity of at least 50%, and forming a catalyst layer containing the catalyst composition, on a heat-resistant inorganic monolith carrier.

The fourth process is a process for producing a catalyst for exhaust gas purification, which comprises adding rare earth component(s) to an aluminum salt or an aluminum alkoxide derivative to obtain an alumina-rare earth composite precursor sol or gel, drying the sol or gel under a supercritical condition to obtain an alumina-rare earth composite porous material, firing the material at a temperature of 500° C. or more to obtain an active alumina-rare earth composite, adding to the composite at least one noble metal selected from Pt, Pd and Rh and, as necessary, rare earth component(s) to obtain a catalyst composition having a specific surface area of at least 50 m²/g and a porosity of at least 50%, and forming a catalyst layer containing the catalyst composition, on a heat-resistant inorganic monolith carrier.

The fifth process is a process for producing a catalyst for exhaust as purification, which comprises adding to an aluminum salt or an aluminum alkoxide, rare earth component(s) and at least one noble metal selected from Pt, Pd and Rh, to obtain a noble metal-dispersed alumina-rare earth composite precursor sol or gel, drying the sol or gel under a supercritical condition to obtain a noble metal-dispersed alumina-rare earth composite porous material, firing the material at a temperature of 500° C. or more to obtain a noble metal-dispersed active alumina-rare earth composite, adding as necessary rare earth component(s) to the composite to obtain a catalyst composition having a specific surface area of at least 50 m²/g and a porosity of at least 50%, and forming a catalyst layer containing the catalyst composition, on a heat-resistant inorganic monolith carrier.

DETAILED DESCRIPTION OF THE INVENTION

The catalyst for exhaust gas purification according to the present invention contains, as the active component, at least one noble metal selected from Pt, Pd and Rh, preferably at least one combination selected from Pt/Rh, Pd/Rh and Pt/Pd/Rh. When the catalyst contains, as the active component, a noble metal combination including Rh, the catalyst can have improved ability for $NO_x$ conversion. In this case, since Rh tends to form an alloy with Pt or Pd and thereby causes catalyst deactivation, Rh is preferably arranged separately from other noble metal(s). The Rh-separated arrangement may be achieved by arranging an agglomerate consisting of a Rh-loaded carrier and other noble metal-loaded carrier, in the form of a mixed catalyst layer, or by arranging a Rh-containing agglomerate and a Pt- or Pd-containing agglomerate in different layers. The arrangement in different layers is preferable because it is more effective for prevention of alloy formation. In the arrangement in different layers, the Rh-containing layer is preferably arranged as a surface layer because it gives higher $NO_x$ conversion ability.

The thickness of the catalyst layer is preferably in the range of 10–100 μm. When the thickness is smaller than 10 μm, the resulting catalyst has insufficient durability. When the thickness is larger than 100 μm, the resulting catalyst produces a larger pressure loss of exhaust gas.

In the arrangement in different layers, the thickness of the surface layer containing Rh is preferably in the range of 5–20 μm. When the thickness is smaller than 5 μm, the resulting catalyst has insufficient durability.

When the thickness is larger than 20 μm, the resulting catalyst has lower light-off performance.

The proportion of the present catalyst composition in the catalyst layer is preferably 2-100%. When the proportion is less than 20%, the resulting catalyst has no desired properties.

The total amount of the noble metal(s) in the catalyst layer is in the range of 10-130 /gft$^3$, preferably 20-100 g/ft$^3$. When the total amount is less than 10 g/ft$^3$, the resulting catalyst has insufficient ability for exhaust gas purification. When the total amount is more than 130 g/ft$^3$, the resulting catalyst shows no further increase in purification ability and invites a higher cost.

The Rh amount in the time total noble metal amount is preferably in the range of 1-15 g/ft$^3$. When the Rh amount is less than 1 g/ft$^3$, the resulting catalyst shows insufficient ability for $NO_x$ conversion. When the Rh amount is more than 15 g/ft$^3$, a higher cost is invited because of the very high cost of Rh.

The weight ratio of other noble metal(s) to Rh [the weight of other noble metal(s)/the weight of Rh] is preferably in the range of 3-20. When the weight ratio is larger than 20, the resulting catalyst has lower ability for $NO_x$ conversion. When the weight ratio is smaller than 3, the resulting catalyst has lower light-off performance and has a higher cost owing to the large amount of Rh.

Addition of a transition metal such as Ni, Co, Fe, Cu, Re, Ir or the like, as necessary, is preferable because it exhibits various auxiliary catalytic activities.

catalyst composition of the present catalyst for exhaust gas purification comprises active alumina, noble metal(s) and, as necessary, rare earth oxide(s). It has a specific surface area of at least 50 m$^2$/g and a porosity of at least 50%. When the specific surface area is less than 50 m$^2$/g, the resulting catalyst easily causes sintering at 1,000° C. and shows significant reduction in catalytic activity. This catalyst composition, when used in a catalyst having a plurality of catalyst layers, is preferably arranged as a surface layer, in view of the prevention of catalyst poisoning and the durability of catalyst. Also preferably, the whole catalyst layer is composed of said catalyst composition.

Also in the present invention, the catalyst composition preferably gives a pore radius distribution curve having a peak in the range of 50-1,000 Å. When the peak of the pore radius distribution curve is in the range of less than 50 Å, the diffusion of exhaust gas into pores is difficult. When the peak of the pore radius distribution curve is in the range of more than 1,000 Å, the dispersion of noble metal(s) in catalyst composition is inferior. A more preferable range is 70-500 Å. When the pore radius distribution curve has a peak in this range, the efficiency of contact between exhaust gas and catalyst is highest. The pore radius distribution curve may have not a single peak but plural peaks; that is, the catalyst composition may have, for example, a bimodal pore structure. Incidentally, the pore radius distribution curve can be obtained by mercury porosimetry, BET method, etc.

The pore volume of the catalyst composition is preferably in the range of 0.5-4.0 ml/g. When the pore volume is smaller than 0.5 ml/g, the diffusion of exhaust gas into pores is difficult. When the pore volume is larger than 4.0 ml/g, the catalyst layer has a lower strength.

A catalyst composition having a specific surface area of at least 100 m$^2$/g and a porosity of at least 70% is more preferred because the resulting catalyst shows high catalytic activity even when subjected to a heat resistance test at about 1,100° C.

Also, the catalyst composition of the present catalyst for exhaust gas purification preferably has a specific surface area of at least 50 m$^2$/g and a porosity of at least 50% even at a high temperature of 1,000° C. This is because catalysts for purification of automobile exhaust gas, when arranged in the manifold, may be exposed to a high temperature of 1,000° C. Conventional catalysts of γ-alumina catalysts, which show significant reduction in specific surface area and porosity at high temperatures, are unable to withstand high-temperature conditions such as mentioned above. Rh, when used in conventional catalysts of γ-alumina catalysts, has strong interaction and causes cohesion at high temperatures by forming a solid solution; therefore, use of a highly porous material is essential for prevention of cohesion.

Hence, in the present invention, it is preferred that the active alumina in the catalyst composition contain no α-phase and be a γ-phase alone, a mixed phase of γ-phase and a θ-phase, or a θ-phase alone. In this case, the γ-phase is a generic name for a γ-phase, a δ-phase, an η-phase, etc. all appearing at lower temperatures than a θ-phase does. The active alumina preferably contains a θ-phase because such an active alumina gives a smaller activity change with time and shows durability at higher temperatures. More preferably, the active alumina contains a θ-phase even at a high temperature of 1,000° C.

In the present invention, the catalyst composition preferably contains rare earth oxide(s) as necessary so as to have oxygen storability and so on. The rare earth oxide may be a single oxide or a compound oxide. The rare earth oxide such as $CeO_2$ may form a compound oxide with $ZrO_2$ as necessary for higher heat resistance and higher oxygen storability.

The rare earth oxide such as $CeO_2$ may be contained in the form of a $CeO_2$ powder alone, or may be contained partly in the form of a compound oxide with active alumina and partly in the form of a $CeO_2$ powder consisting of relatively large particle diameters (0.5-5 μm) for improved dispersion of noble metal(s).

Since Rh tends to form a solid solution with $CeO_2$ or the like and thereby cause catalyst deactivation, it is preferred that Rh and $CeO_2$ or the like be contained separately in a catalyst layer.

The amount of the rare earth oxide in the catalyst composition is preferably in the range of 2-35% by weight. When the amount is less than 2% by weight, the effect of rare earth oxide use is insufficient. When the amount is more than 35% by weight, the catalyst composition has low heat resistance.

The catalyst composition may contain a small amount, for example, 10% or less by weight of a crystallization suppressant such as $SiO_2$, P or the like in order to improve the heat resistance of the active alumina in the catalyst composition.

Since the catalyst for exhaust gas purification according to the present invention is used under severe conditions as a converter, an electrically-heated catalyst, etc., the monolith carrier in the catalyst composition must be a monolith carrier consisting of a heat-resistant inorganic substance. As the material constituting the monolith carrier, there are suitably used ceramics such as cordierite, mullite and the like and metals such as Fe—Cr—Al and the like.

When the present catalyst is used as an electrically-heated catalyst, there may be used a conventional foil type monolith carrier consisting of a heat-resistant stainless steel, but a metallic monolith carrier of honeycomb structure obtained by powder metallurgy is preferred because it has no problems of mechanical strength and telescoping and is highly reliable.

Next, description is made on the present processes for producing catalysts for exhaust gas purification. First, the starting materials are described.

As the aluminum and rare earth materials, there are used metal salts or metal alkoxide derivatives. The metal salts have no particular restriction as long as they are soluble in a solvent used, but acetates, nitrates, chlorides, etc. are preferably used. The metal alkoxide derivatives are preferred in view of the easiness of hydrolysis to produce a sol or gel.

The metal alkoxide derivatives are represented by chemical formula $M(OR)_n$. R represents an alkyl group and/or an organic compound capable of making multidentate coordination via oxygen or the like, and is appropriately selected in view of the solubility of metal alkoxide in solvent used. The organic compound capable of making multidentate coordination can be not only a compound in which an anion of a carboxylate or the like is bonded to aluminum via the carbonyl oxygen, but also a compound which is bonded to aluminum in a neutral form. The alkyl group preferably has 1–6 carbon atoms. As the organic compound capable of making multidendate coordination, there are preferred β-ketocarboxylic acids, β-diketones, esters (particularly, β-ketoesters), β-ketoamides, alkanolamines and carbonations which are said compounds that have dissociated one or more protons. However, any organic compound capable of making multidendate coordination can be used as long as it can reduce the hydrolysis rate of the metal alkoxide.

With respect to the noble metal(s), the type(s) of noble metal salt(s) used is (are) not particularly restricted. However, there are generally used nitrates, acetates, dinitrodiammine salts, chlorides, acid chlorides, etc. The noble metal salt(s) must be soluble in a solvent used.

The solvent is not particularly restricted as long as it is an organic solvent in which the metal salts and metal alkoxide derivatives mentioned above are soluble. However, a polar solvent is preferred and an alcohol is particularly preferred. Preferred are, for example, methanol, ethanol, propanol, ethylene glycol, methoxyethanol and ethoxyethanol.

Then, description is made on the methods for producing precursor sols or gels.

The alumina precursor sol or gel can be obtained by hydrolyzing an aluminum salt or an aluminum alkoxide derivative.

The noble metal-dispersed alumina precursor gel or sol, the alumina-rare earth composite precursor gel or sol and the noble metal-dispersed alumina-rare earth composite precursor gel or sol can be obtained by the following methods.

Method A

A solution containing an aluminum salt or alkoxide derivative and salts or alkoxide derivatives of other components to be added [noble metal(s) and rare earth element(s)] is hydrolyzed.

Method B

An aluminum salt or alkoxide derivative is mixed with other components (hydroxides obtained by hydrolysis or the like), and the mixture is hydrolyzed.

Method C

An aluminum salt or alkoxide derivative and salts or alkoxide derivatives of other components are hydrolyzed separately, and the resulting hydroxides are mixed with each other.

Method D

When a noble metal-dispersed alumina-rare earth composite precursor gel. or sol is obtained, the methods A to C are combined as desired, whereby a desired sol or gel can be obtained.

Of the above methods, the method A or B is preferable because it can produce a gel or sol of uniform composition.

When the hydrolysis is conducted using an alkoxide derivative, the hydrolysis product can be obtained in a desired form of sol, gel, precipitated powder or the like by controlling the volume of water used. In obtaining a gel, it is preferable to use water of an amount of 0.5–4 moles per mole of the alkoxide derivative employed. In this case, an acid or a base may be used as a catalyst.

Subsequently, description is made on the method for producing active alumina.

The sol or gel produced by the above method contains an organic solvent. This organic solvent can be removed by drying of gel under a supercritical condition (this drying is hereinafter referred to as "supercritical drying"), but the drying of gel may be conducted in a mixed system of said organic solvent and other chemical substance, for example, a mixed system of the organic solvent and carbon dioxide. In this case, the supercritical condition refers to a condition which is beyond the critical temperature ($T_c$) and critical pressure ($P_c$) of the mixed system consisting of time organic solvent and other chemical substance, and indicates a condition in which the organic solvent or the mixture is a supercritical fluid and has properties intermediate between those of liquid and gas.

The dried gel obtained above is calcinated at a given temperature. The calcination temperature must be at least 500° C. to burn off the organic substances remaining in the pores of the dried gel, but a calcination temperature exceeding 1,200° C. is not preferred because it brings about reduction in specific surface area and promotes cohesion of noble metal(s).

When the present catalyst is provided in a manifold of an automobile gasoline engine, it is exposed to temperatures of 800° C. or more. Hence, the above calcination temperature is preferably 800°–1,200° C. in view of the heat resistance required for the catalyst obtained.

In producing the catalyst composition, there are as necessary added, to the above obtained active alumina, noble metal-dispersed active alumina, active alumina-rare earth composite, or noble metal-dispersed active alumina-rare earth composite, at least one noble metal selected from Pt, Pd and Rh and rare earth component(s).

The noble metal(s) and rare earth component are added to the oxide or composite, for example, by using respective salt solutions and employing a known means such as impregnation or the like. In this case, a solvent such as water, an organic solvent, a mixture thereof or the like may be used.

The noble metal(s) and rare earth component may be added simultaneously or separately. As necessary, a heat treatment step is carried out at a temperature of 500° C. or more.

The addition of noble metal component(s) can be conducted as necessary even when the active alumina already contains noble metal component(s) of same or different kind(s) dispersed therein, using respective salt solutions.

When the rare earth component(s) is(are) added to the composite already containing rare earth component(s), in the form of an oxide powder (particle diameters=0.3-2.5 μm), the resulting composite has improved heat resistance.

As above, noble metal(s) and rare earth component(s) are added as necessary. Then, a heat treatment is preferably conducted at a temperature of 500° C. or more for stabilization. However, a heat treatment at a temperature exceeding 1,200° C. is not preferable because it brings about reduction in specific surface area and promotes cohesion of noble metal(s).

Thus, there can be obtained a catalyst composition having a specific surface area of at least 50 $m^2/g$ and a porosity of at least 50%.

The thus obtained catalyst composition is mixed, as necessary, with a noble metal-q-alumina-rare earth catalyst composition (obtained by ordinary process) or the like and further, as necessary, with rare earth oxide(s). Thereto are added water, a deflocculant (e.g. acetic acid, nitric acid), etc. The resulting mixture is pulverized by a wet method to obtain a slurry which is used for production of a desired catalyst for exhaust gas purification having a mixed catalyst layer or plural catalyst layers. In the wet method pulverization, besides water, an organic solvent, a mixture thereof or the like may be added.

The resulting slurry is coated on a heat-resistant inorganic monolith carrier and dried. Then, firing is conducted at a temperature of 500° C. or more to obtain a desired catalyst for exhaust gas purification. When coating of slurry is conducted a plurality of times using a plurality of slurries, a firing step may be conducted between two successive coatings.

The present invention is hereinafter described in more detail by way of Examples. However, the present invention is in no way restricted to the Examples.

[Preparation of Catalyst Compositions]

Catalyst compositions Nos. 1-29 shown in Table 1 were prepared by the catalyst composition preparation methods A-H and the reference catalyst composition preparation methods X-Z all described below, and were used For preparation of the catalysts for exhaust gas purification described later.

(Catalyst Composition Preparation Method A)

Ethyl acetate aluminum diisopropylate (274 g) was dissolved in ethanol (500 ml). Thereto was added water (72 ml), and hydrolysis was conducted to obtain a gel. The gel was heat-treated in an autoclave for 12 hours under a supercritical condition of ethanol, i.e. 270° C. and 250 $kg/cm^2$. Then, the solvent was removed under reduced pressure to obtain an alumina porous material.

The alumina porous material was calcinated in the air For 5 hours at various temperatures of 500° C., 800° C., 1,000° C., and 1,200° C. to obtain active aluminas. (Incidentally, the 400° C. calcination product was rehydrolyzed in the later catalyst preparation step and lost porosity.)

To each alumina was added an appropriate amount of acetic acid as a deflocculant. There were further added a solution containing Pt, Pd, Rh or a combination thereof, an aqueous cerium acetate solution and cerium oxide having a particle diameter of 1 μm (total cerium amount=30 parts in terms of ceria per 70 parts of active alumina) so as to give a composition shown in Table 1. Each resulting mixture was pulverized by a wet method, subjected to a drying step of 120° C. and fired in the air at 550° C. for 3 hours to obtain catalyst compositions.

In the preparation of catalyst compositions containing Rh, there was a case in which neither aqueous cerium acetate solution nor cerium oxide was added.

In the present preparation method and the later preparation methods, each noble metal solution was dinitrodiammine platinum solution, palladium nitrate solution, or rhodium nitrate solution.

(Catalyst Composition Preparation Method B)

There was used the same procedure as in the catalyst composition preparation method A except that there was added, as the cerium component, only cerium oxide having a particle diameter of 1 mm (30 parts in terms of ceria per 70 parts of active alumina) so as to give a composition shown in Table 1.

(Catalyst Composition Preparation Method C)

There was used the same procedure as in the catalyst composition preparation method B except that in the wet disintegration after addition of acetic acid, noble metal solution(s) and cerium oxide, there was used, as the solvent, ethanol in place of water.

(Catalyst Composition Preparation Method D)

Ethyl acetate aluminum diisopropylate (274 g) was dissolved in ethanol (500 ml). Thereto was added an aqueous solution (72 ml) containing dinitrodiammineplatinum (1.079 g), followed by hydrolysis to obtain a platinum-dispersed alumina precursor gel.

Separately, ethyl acetate aluminum diisopropylate (274 g) was dissolved in ethanol (500 ml). Thereto was added an aqueous solution (72 ml) containing rhodium nitrate (0.219 g), followed by hydrolysis to obtain a rhodium-dispersed alumina precursor gel. These gels were heat-treated in an autoclave for 12 hours under a supercritical condition of ethanol, i.e. 270° C. and 250 $kg/cm^2$. Then, the solvent was removed under reduced pressure to obtain a Pt-dispersed alumina porous material (porous gel) and a Rh-dispersed alumina porous material (porous gel).

The Pt-dispersed alumina porous material (porous gel) and the Rh-dispersed alumina porous material (porous gel) were calcinated in the air at 1,000° C. for 5 hours to obtain noble metal-dispersed active aluminas. To each of them were added acetic acid, an aqueous cerium acetate solution and cerium oxide so as to give a composition shown in Table 1. Each of the resulting mixtures was pulverized by a wet method, subjected to a drying step of 120° C., and fired in the air at 550° C. for 3 hours to obtain catalyst compositions.

In the preparation of the catalyst compositions containing Rh, there was a case in which neither aqueous cerium acetate solution nor cerium oxide was added.

(Catalyst Composition Preparation Method E)

Ethyl acetate aluminum diisopropylate (274 g) was dissolved in ethanol (500 ml). Thereto was added an aqueous solution (72 ml) containing dinitrodiammineplatinum (0.540 g), followed by hydrolysis to obtain a platinum-dispersed alumina precursor gel.

Separately, ethyl acetate aluminum diisopropylate (274 g) was dissolved in ethanol (500 ml). Thereto was added all aqueous solution (72 ml) containing rhodium nitrate (0.110 g), followed by hydrolysis to obtain a rhodium-dispersed alumina precursor gel. These gels were heat-treated in an autoclave for 12 hours under a supercritical condition of ethanol, i.e. 270° C. and 250 kg/cm$^2$. Then, the solvent was removed under reduced pressure to obtain a Pt-dispersed alumina porous material (porous gel) and a Rh-dispersed alumina porous material (porous gel).

The Pt-dispersed alumina porous material (porous gel) and the Rh-dispersed alumina porous material (porous gel) were calcinated in the air at 1,000° C. for 5 hours to obtain noble metal-dispersed active aluminas. To each of these active aluminas were added an appropriate amount of acetic acid as a deflocculant, an aqueous cerium acetate solution and cerium oxide having a particle diameter of 1 μm (total cerium amount=30 parts in terms of ceria per 70 parts of active alumina), and a Pt solution (in the case of the Pt-dispersed active alumina) or a Rh solution (in the case of the Rh-dispersed active alumina) so as to give a Final composition (including the noble metals added in hydrolysis) shown in Table 1. Each of the resulting mixtures was pulverized by a wet method, subjected to a drying step of 120° C. and fired in the air at 550° C. for 3 hours to obtain catalyst compositions.

In the preparation of the catalyst compositions containing Rh, there was a case in which neither aqueous cerium acetate solution nor cerium oxide was added.

(Catalyst Composition Preparation Method F)

In ethanol (500 ml) were dissolved ethyl acetate aluminum diisopropylate (274 g) and tetra-n-butoxycerium (7.462 g). Water (72 ml) was added to give rise to hydrolysis to obtain a gel. The gel was heat-treated in an autoclave for 12 hours under a supercritical condition of ethanol, i.e. 270° C. and 250 kg/cm$^2$. Then, the solvent was removed under reduced pressure to obtain an alumina-ceria composite porous material.

To the alumina-ceria composite porous material were added acetic acid, a Pt solution or a Rh solution, and cerium oxide so as to give a composition shown in Table 1. Each of the resulting mixtures was pulverized by a wet method, subjected to a drying step of 120° C. and fired in the air at 550° C. for 3 hours to obtain catalyst compositions.

(Catalyst Composition Preparation Method G)

In ethanol (500 ml) were dissolved ethyl acetate aluminum diisopropylate (274 g) and tetra-n-butoxycerium (7.462 g). Water (72 ml) was added to give rise to hydrolysis to obtain a gel. The gel was heat-treated in an autoclave for 12 hours under a supercritical condition of ethanol, i.e. 270° C. and 250 kg/cm$^2$. Then, the solvent was removed under reduced pressure to obtain an alumina-ceria composite porous material.

The alumina-cerla composite porous material was fired in the air at 1,000° C. for 5 hours to obtain an active alumina-cerla composite. Thereto were added acetic acid, a Pt solution or a Rh solution, and cerium oxide so as to give a composition shown in Table 1. Each of the resulting mixtures was pulverized by a wet method, subjected to a drying step of 120° C. and fired in the air at 550° C. for 3 hours to obtain catalyst compositions.

(Catalyst Composition Preparation Method H)

In ethanol (500 ml) were dissolved ethyl acetate aluminum diisopropylate (274 g) and tetra-n-butoxycerium (7.462 g). Thereto was added an aqueous solution (72 ml) containing dinitrodiammineplatinum (1.079 g) to give rise to hydrolysis to obtain a platinum-dispersed alumina-ceria composite precursor gel. Separately, in ethanol (500 ml) were dissolved ethyl acetate aluminum diisopropylate (274 g) and tetra-n-butoxycerium (7.462 g). Thereto was added an aqueous solution (72 ml) containing rhodium nitrate (0.219 g) to give rise to hydrolysis to obtain a rhodium-dispersed alumina-ceria composite precursor gel. Each of these gels was heat-treated in an autoclave for 12 hours under a supercritical condition of ethanol., i.e. 270° C. and 250 kg/cm$^2$. Then, the solvent was removed under reduced pressure to obtain a Pt-dispersed alumina-ceria composite porous material and a Rh-dispersed alumina-ceria composite porous material.

Each of the Pt-dispersed alumina-ceria composite porous material and the Rh-dispersed alumina-ceria composite porous material was fired in the air at 1,000° C. for 5 hours to obtain a Pt-dispersed active alumina-ceria composite and a Rh-dispersed active alumina-ceria composite. To each of them were added acetic acid and cerium oxide so as to give a composition shown in Table 1. Each of the resulting mixtures was pulverized by a wet method, subjected to a drying step of 120° C. and fired in the air at 550° C. for 3 hours to obtain catalyst compositions.

(Reference Catalyst Composition Preparation Method X)

There was used the same procedure as in the catalyst composition preparation method A except that no supercritical drying was conducted and an alumina gel obtained by ordinary sol-gel method was calcinated in the air at 1,000° C. for 5 hours.

(Reference Catalyst Composition Preparation Method Y)

There was used the same procedure as in the catalyst composition preparation method A except that commercial γ-alumina (specific surface area by BET method=200 m$^2$/g) was used in place of active alumina.

(Reference Catalyst Composition Preparation Method Z)

There was used the same procedure as in the catalyst composition preparation method A except that there was used, in place off active alumina, an alumina obtained by calcinating commercial γ-alumina (specific surface area by BET method=200 m$^2$/g) in the air at 1,000° C. for 5 hours.

TABLE 1

| Catalyst composition No. | Preparation method | Kind(s) of noble metal(s) | Concentration(s) of noble metal(s) (wt %) | Calcination temp. of porous material (porous gel) (°C.) | BET Specific surface area ($m^2/g$) Before test | BET Specific surface area ($m^2/g$) After test[2] | Porosity (%) Before test | Porosity (%) After test | Crystalline phase Before test | Crystalline phase After test | Peak radius (Å) in pore radius distribution curve Before test | Peak radius (Å) in pore radius distribution curve After test |
|---|---|---|---|---|---|---|---|---|---|---|---|---|
| 1 | A | Pt + Rh | Pt 0.672 Rh 0.035 | 500 | 189 | 78 | 93 | 51 | γ | θ | 271 | 120 |
| 2 | A | Pt + Rh | Pt 0.672 Rh 0.035 | 800 | 175 | 84 | 85 | 58 | γ, θ | θ | 208 | 148 |
| 3 | A | Pt + Rh | Pt 0.672 Rh 0.035 | 1000 | 107 | 92 | 74 | 64 | θ | θ | 175 | 170 |
| 4 | A | Pt + Rh | Pt 0.672 Rh 0.035 | 1200 | 51 | 50 | 57 | 56 | θ (>α) | θ (>α) | 165 | 163 |
| 5 | A | Pt | 0.895 | 1000 | 95 | 90 | 76 | 65 | θ | θ | 175 | 170 |
| 6 | A | Rh | 0.141 | 1000 | 104 | 93 | 74 | 63 | θ | θ | 175 | 169 |
| 7[1] | A | Rh | 0.141 | 1000 | 134 | 125 | 80 | 73 | θ | θ | 181 | 176 |
| 8 | B | Pt | 0.895 | 1000 | 128 | 113 | 78 | 70 | θ | θ | 180 | 175 |
| 9 | B | Rh | 0.141 | 1000 | 131 | 114 | 79 | 71 | θ | θ | 183 | 176 |
| 10 | C | Pt | 0.895 | 1000 | 167 | 138 | 87 | 80 | θ | θ | 197 | 181 |
| 11 | C | Rh | 0.141 | 1000 | 159 | 130 | 85 | 79 | θ | θ | 189 | 180 |
| 12 | A | Pt | 0.785 | 1000 | 105 | 90 | 72 | 64 | θ | θ | 173 | 167 |
| 13 | A | Rh | 0.471 | 1000 | 107 | 90 | 74 | 64 | θ | θ | 172 | 165 |
| 14 | A | Pd | 0.785 | 1000 | 108 | 91 | 75 | 64 | θ | θ | 172 | 165 |
| 15 | A | Rh | 0.471 | 1000 | 107 | 91 | 74 | 65 | θ | θ | 172 | 165 |
| 16 | D | Pt | 0.895 | 1000 | 101 | 89 | 73 | 63 | θ | θ | 171 | 166 |
| 17 | D | Rh | 0.141 | 1000 | 113 | 108 | 75 | 71 | θ | θ | 175 | 169 |
| 18 | E | Pt | 0.895 | 1000 | 102 | 78 | 74 | 62 | θ | θ | 175 | 158 |
| 19 | E | Rh | 0.141 | 1000 | 105 | 84 | 75 | 64 | θ | θ | 178 | 159 |
| 20 | F | Pt | 0.895 | — | 228 | 55 | 92 | 57 | — | θ | 205 | 118 |
| 21 | F | Rh | 0.141 | — | 210 | 50 | 91 | 51 | — | θ | 195 | 115 |
| 22 | G | Pt | 0.895 | 1000 | 105 | 93 | 80 | 65 | θ | θ | 173 | 163 |
| 23 | G | Rh | 0.141 | 1000 | 103 | 95 | 79 | 65 | θ | θ | 171 | 165 |
| 24 | H | Pt | 0.895 | 1000 | 79 | 69 | 79 | 75 | θ | θ | 295 | 290 |
| 25 | H | Rh | 0.141 | 1000 | 88 | 75 | 89 | 80 | θ | θ | 293 | 287 |
| 26 | X | Pt + Rh | Pt 0.672 Rh 0.035 | (1000) | 31 | 14 | 31 | 16 | α, θ | α | — | — |
| 27 | Y | Pt + Rh | Pt 0.672 Rh 0.035 | — | 146 | 49 | 65 | 30 | γ | θ, α | 41 | 35 |
| 28 | Y | Pt | 0.895 | — | 142 | 47 | 64 | 28 | γ | θ, α | 42 | 34 |
| 29 | Z | Pt + Rh | Pt 0.672 Rh 0.035 | (1000) | 91 | 45 | 41 | 24 | θ, γ | θ, α | 38 | 31 |

[1]No Ce component was added in No. 7.
[2]Test conditions: 1.000° C. × 20 hours in the air.

[Preparation of Catalysts for Exhaust Gas Purification]

Catalysts for exhaust gas purification were prepared using the catalyst compositions obtained by the above-described preparation methods, in accordance with the below-described methods I–VI for preparation of catalysts for exhaust gas purification.

(Method I for Preparation of Catalysts for Exhaust Gas Purification)

The catalyst composition Nos. 1–6 shown in Table 1 were used alone or in combination so as to give noble metal ratios shown in Table 2. Thereto was added an appropriate amount of a deflocculant. Each of the resulting mixtures was pulverized by a wet method to obtain slurries. In each of the slurries was dipped a cordierite honeycomb carrier (rib thickness=6 mil, cell density=400 cpi$^2$, diameter=1 inch, length=2 inches) so that the amount of the slurry loaded on the carrier became 0.15 g per cc of the honeycomb volume. Each of the coated carriers was dried and fired at 550° C. for 3 hours to obtain catalysts for exhaust gas purification of Examples 1–5, shown in Table 2.

(Method II for Preparation of Catalysts for Exhaust Gas Purification)

Slurries were obtained in the same procedure as in the method I for preparation of catalysts for exhaust gas purification. One of the slurries containing Pt or Pd was loaded on a cordierite honeycomb carrier so that the amount of the slurry loaded became 0.11 g per cc of the honeycomb volume. The coated carrier was fired at 550° C. for 3 hours to form a first catalyst layer. Then, on the first catalyst layer was loaded one of the above slurries containing Rh so that the amount of the slurry loaded became 0.04 g per cc of the honeycomb volume. The resulting material was fired at 550° C. for 3 hours to form a second catalyst layer on the first catalyst layer, whereby catalysts for exhaust gas purification of Examples 6–8 and 10–16, shown in Table 2 were obtained.

(Method III for Preparation of Catalyst for Exhaust Gas Purification)

A catalyst for exhaust gas purification of Example 9, shown in Table 2 was obtained using the catalyst composition Nos. 10–11, in the same procedure as in the method II for preparation of catalysts for exhaust gas purification except that in the wet pulverization after addition of a deflocculant, ethanol was used as a solvent in place of water to obtain a slurry.

(Method IV for Preparation of Catalyst for Exhaust Gas Purification)

The catalyst composition Nos. 6 and 28 were mixed so as to give a noble metal ratio shown in Table 2. To the mixture was added an appropriate amount of a deflocculant. The resulting mixture was pulverized by a wet method to obtain a slurry. In the slurry was dipped a cordierite honeycomb carrier so that the amount of the slurry loaded on the carrier became 0.15 g per cc of the honeycomb volume. The coated carrier was dried and then fired at 550° C. for 3 hours to obtain a catalyst for exhaust gas purification of Example 17, shown in Table 2.

obtained in the same procedure as in the method I for preparation of catalysts for exhaust gas purification except that there were used slurries made from the catalyst composition Nos. 26, 27 and 29 prepared by the reference catalyst composition preparation methods X-Z, in place of the slurries made from the catalyst composition Nos. 1-6.

TABLE 2

| Catalyst for exhaust gas purification | Method for preparation of catalyst for exhaust gas purification | Catalyst Composition No. | Method for preparation | Noble metals (Kinds, ratio, amount loaded (g/ft$^3$)) | Structure of catalyst layer(s) |
|---|---|---|---|---|---|
| Example 1 | I | 1 | A | Pt/Rh = 19/1, 30 | A mixed layer (simultaneous loading of Pt and Rh) |
| Example 2 | I | 2 | A | Pt/Rh = 19/1, 30 | A mixed layer (simultaneous loading of Pt and Rh) |
| Example 3 | I | 3 | A | Pt/Rh = 19/1, 30 | A mixed layer (simultaneous loading of Pt and Rh) |
| Example 4 | I | 4 | A | Pt/Rh = 19/1, 30 | A mixed layer (simultaneous loading of Pt and Rh) |
| Example 5 | I | 5 + 6 | A | Pt/Rh = 19/1, 30 | A mixed layer (separate loading of Pt and Rh) |
| Example 6 | II | 5 + 6 | A | Pt/Rh = 19/1, 30 | Two layers |
| Example 7 | II | 5 + 7 | A | Pt/Rh = 19/1, 30 | Two layers |
| Example 8 | II | 8 + 9 | B | Pt/Rh = 19/1, 30 | Two layers |
| Example 9 | III | 10 + 11 | C | Pt/Rh = 19/1, 30 | Two layers |
| Example 10 | II | 12 + 13 | A | Pt/Rh = 5/1, 30 | Two layers |
| Example 11 | II | 14 + 15 | A | Pd/Rh = 5/1, 30 | Two layers |
| Example 12 | II | 16 + 17 | D | Pt/Rh = 19/1, 30 | Two layers |
| Example 13 | II | 18 + 19 | E | Pt/Rh = 19/1, 30 | Two layers |
| Example 14 | II | 20 + 21 | F | Pt/Rh = 19/1, 30 | Two layers |
| Example 15 | II | 22 + 23 | G | Pt/Rh = 19/1, 30 | Two layers |
| Example 16 | II | 24 + 25 | H | Pt/Rh = 19/1, 30 | Two layers |
| Example 17 | IV | 6 + 28 | A, Y | Pt/Rh = 19/1, 30 | A mixed layer (separate loading of Pt and Rh) |
| Example 18 | V | 6 + 28 | A, Y | Pt/Rh = 19/1, 30 | Two layers |
| Comparative Example 1 | VI | 26 | X | Pt/Rh = 19/1, 30 | A mixed layer (similtaneous loading of Pt and Rh) |
| Comparative Example 2 | VI | 27 | Y | Pt/Rh = 19/1, 30 | A mixed layer (similtaneous loading of Pt and Rh) |
| Comparative Example 3 | VI | 29 | Z | Pt/Rh = 19/1, 30 | A mixed layer (similtaneous loading of Pt and Rh) |

(Method V for Preparation of Catalyst for Exhaust Gas Purification)

Slurries were obtained in the same procedure as in the method I for preparation of catalysts for exhaust gas purification. One of the slurries prepared from the catalyst composition No. 28 was loaded on a cordierite honeycomb carrier so that the amount of the slurry loaded became 0.11 g per cc of the honeycomb volume. The loaded carrier was fired at 550° C. for 3 hours to form a first catalyst layer. On the first catalyst layer was loaded the other slurry prepared from the catalyst composition No. 6 so that the amount of the slurry loaded became 0.04 g per cc of the honeycomb volume. The resulting material was fired at 550° C. for 3 hours to form a second catalyst layer on the first catalyst layer, whereby a catalyst for exhaust gas purification of Example 18, shown in Table 2 was obtained.

(Method VI for Preparation of Comparative Catalysts for Exhaust Gas Purification)

Comparative catalysts for exhaust gas purification of Comparative Examples 1-3, shown in Table 2 were

[Evaluation for Method for Catalyst Composition]

The catalyst compositions obtained by the preparation methods A-H and X-Z were evaluated for properties (BET specific surface area, porosity, crystalline phase and pore radius distribution) before and after a heat resistance test (1,000° C. ×20 hours in the air). The results are shown in Table 1. Incidentally, the catalyst composition Nos. 20 and 21 were obtained by a method in which no calcination of porous material was conducted, i.e. the catalyst composition preparation method F. In the catalyst composition No. 26, no clear peak was seen in the pore radius distribution curve.

The evaluations of properties were made by the following methods.

(BET Specific Surface Area and Pore Radius Distribution)

Were measured by nitrogen adsorption-desorption method.

(Porosity)

Was calculated by using the volume of pores having radii of 1,000 Å or less, obtained by nitrogen adsorption-desorption method (the specific gravity of catalyst composition was assumed to be 4.52 g/cm$^2$, based on q-alumina = 3.40 g/cm$^2$ and ceria = 7.13 g/cm$^2$).

(Crystalline Phase)

The identification of crystalline phase was made by powder X-ray diffraction method. In Table 1, only the change in crystalline phase of alumina is shown.

The following became clear from the results of the above evaluations.

(1) All of the catalyst composition Nos. 1–25 obtained by the preparation methods according to the present invention have specific surface areas of at least 50 m$^2$/g and porosities of at least 50%.

(2) The catalyst composition Nos. 1–25 obtained by the preparation methods according to the present invention have specific surface areas of at least 50 m$^2$/g and porosities of at least 50% even after a heat resistance test of 1,000° C. ×20 hours, and the reductions in specific surface area and porosity after the heat resistance test are small.

(3) In contrast, the catalyst composition Nos. 26–29 obtained by the preparation methods according to conventional techniques, even when having specific surface areas of 50 m$^2$/g or more and porosities of 50% or more before the heat resistance test, give large reductions in specific surface area and porosity after the heat resistance test. All of them give specific surface areas smaller than 50 m$^2$/g and porosities smaller than 50% after the heat resistance test.

[Evaluation for Catalysts for Exhaust Gas Purification]

(1) Durability Test

In order to estimate the durability, each of the catalysts for exhaust gas purification of Examples 1–18 and Comparative Examples 1–3, obtained by the methods I–VI for preparation of catalysts for exhaust gas purification, was subjected to aging for total 30 hours with a fuel-cut mode by using an exhaust gas emitted from an actual automobile gasoline engine and setting the catalyst temperature at 850° C.

(2) Catalytic Performance Evaluation Test

Using each catalyst after the above durability test, the light-off performance and the steady-state performance were evaluated by a bench test.

In the evaluation of the light-off performance, a catalyst sample was set in an evaluation apparatus; a pseudo exhaust gas of λ = 1.0 was introduced at a space velocity of 50,000 hr$^{-1}$ and a heating rate of 10° C./min; and the temperatures at which the conversions of each of CO, HC and NO$_x$ became 50%, were taken as light-off temperatures.

In the evaluation of the steady-state performance, a catalyst sample was set in an evaluation apparatus; a pseudo exhaust gas of 400° C. and λ = 1.0 was introduced at a space velocity of 50,000 hr$^{-1}$; and the conversions (%) of CO, HC and NO$_x$ were measured.

The results are shown in Table 3.

TABLE 3

| Catalyst for exhaust gas purification | Light-off performance after durability test T50% (°C.) | | | Steady-state performance after durability test [Conversion at λ = 1.0 (%)] | | | Remarks |
|---|---|---|---|---|---|---|---|
| | CO | HC | NO$_x$ | CO | HC | NO$_x$ | |
| Example 1 | 327 | 330 | 316 | 89 | 78 | 79 | Influence of the calcination temp. of porous gel. |
| Example 2 | 313 | 317 | 304 | 91 | 83 | 83 | Influence of the calcination temp. of porous gel. |
| Example 3 | 310 | 314 | 301 | 92 | 84 | 86 | Influence of the calcination temp. of porous gel. |
| Example 4 | 317 | 322 | 307 | 91 | 81 | 83 | Influence of the calcination temp. of porous gel. |
| Example 5 | 301 | 303 | 292 | 94 | 88 | 89 | A mixed catalyst layer |
| Example 6 | 295 | 300 | 285 | 95 | 90 | 91 | Two catalyst layers |
| Example 7 | 291 | 297 | 277 | 96 | 92 | 93 | The Rh layer contained no Ce component. |
| Example 8 | 292 | 298 | 281 | 96 | 91 | 91 | Only CeO$_2$ powder was used as the cerium component. |
| Example 9 | 288 | 294 | 276 | 97 | 94 | 94 | Influence of the solvent used in wet pulverization. |
| Example 10 | 274 | 278 | 265 | 99 | 98 | 99 | Influence of the kinds and ratio of noble metals. |
| Example 11 | 266 | 270 | 272 | 99 | 99 | 96 | Influence of the kinds and ratio of noble metals. |
| Example 12 | 295 | 301 | 283 | 95 | 91 | 91 | Influence of the catalyst composition preparation method. |
| Example 13 | 293 | 298 | 283 | 96 | 92 | 91 | Influence of the catalyst composition preparation method. |
| Example 14 | 307 | 311 | 294 | 93 | 86 | 88 | Influence of the catalyst composition preparation method. |
| Example 15 | 302 | 303 | 291 | 94 | 88 | 89 | Influence of the catalyst composition preparation method. |
| Example 16 | 297 | 304 | 290 | 94 | 89 | 90 | Influence of the catalyst composition preparation method. |
| Example 17 | 315 | 321 | 305 | 91 | 82 | 83 | Partial replacement of catalyst composition |
| Example 18 | 312 | 318 | 302 | 92 | 84 | 85 | Partial replacement of catalyst composition |
| Comparative | 328 | 335 | 321 | 88 | 79 | 71 | |

TABLE 3-continued

| Catalyst for exhaust gas purification | Light-off performance after durability test T50% (°C.) | | | Steady-state performance after durability test [Conversion at $\lambda = 1.0$ (%)] | | | Remarks |
|---|---|---|---|---|---|---|---|
| | CO | HC | $NO_x$ | CO | HC | $NO_x$ | |
| Example 1 | | | | | | | |
| Comparative Example 2 | 330 | 336 | 321 | 88 | 78 | 69 | |
| Comparative Example 3 | 341 | 345 | 328 | 86 | 74 | 64 | |

The following became clear from the results of the above evaluations.

(1) The catalysts for exhaust gas purification of Examples 1–18 according to the present invention are superior in catalytic performance to the catalysts for exhaust gas purification of Comparative Examples 1–3 according to conventional techniques.

(2) More excellent catalytic performance is are seen when the calcination temperature of porous material (porous gel) is 800°–1,200° C.

(3) Catalysts having two catalyst layers give excellent catalytic performance than catalysts having a mixed catalyst layer.

(4) In the case of a mixed catalyst layer, separate loading of Pt and Rh gives more excellent catalytic performance.

(5) Both the Pt/Rh-loaded catalysts and the Pd/Rh-loaded catalyst show excellent catalytic performance.

(6) All of the catalysts for exhaust gas purification obtained by the catalyst composition preparation methods A–H show excellent catalytic performance.

(7) Even the Examples in which part of the catalyst composition was replaced by the catalyst composition obtained by the reference catalyst composition preparation method, are superior in catalytic performance to the Comparative Examples in which the whole catalyst composition was obtained by the reference catalyst composition preparation method.

What is claimed is:

1. A catalyst for exhaust gas purification, comprising: a heat-resistant inorganic carrier; and
a catalyst layer loaded on said carrier, said catalyst layer comprising a catalyst composition containing at least one noble metal selected from the group consisting of Pt, Pd and Rh, and active alumina, said catalyst composition maintaining a specific surface area of not less than 50 m²g/ and a porosity of not less than 50% after the catalyst composition is held at 1,000° C. for 20 hours in air, wherein said catalyst composition has a pore radius distribution curve having a peak in a range of 50–1,000 Å.

2. The catalyst of claim 1, wherein said catalyst composition further comprises a rare earth oxide.

3. The catalyst of claim 1, wherein the catalyst composition has a specific surface area of not less than 100 m²/g and a porosity of not less than 70%.

4. The catalyst of claim 1, wherein said catalyst composition maintains a specific surface area of not less than 90 m²/g and a porosity of not less than 65% after the catalyst composition is held at 1,000° C. for 20 hours in air.

5. The catalyst of claim 1, wherein said catalyst composition maintains a specific surface area of not less than 113 m²/g and a porosity of not less than 70% after the catalyst composition is held at 1,000° C. for 20 hours in air.

6. The catalyst of claim 1, wherein the catalyst composition contains at least one combination selected from the group consisting of Pt/Rh, Pd/Rh, Pt/Pd/Rh, and wherein Rh is separated from said other noble metals.

7. The catalyst of claim 1, wherein said heat-resistant inorganic carrier is a monolith.

8. The catalyst of claim 1, wherein said catalyst composition is produced by:
hydrolyzing an aluminum salt or an aluminum alkoxide derivative to obtain an alumina precursor sol or gel;
drying said sol or gel under a supercritical temperature and pressure to obtain an alumina porous material;
firing the material at a temperature of not less than 500° C. to obtain active alumina; and
adding at least one noble metal selected from the group consisting of Pt, Pd and Rh to said active alumina to obtain said catalyst composition.

9. The catalyst of claim 3, wherein said catalyst composition has a specific surface area of not less than 131 m²/g.

10. The catalyst of claim 3, wherein said catalyst composition has a specific surface area of not less than 159 m²/g.

11. A catalyst for exhaust gas purification, comprising:
a heat-resistant inorganic carrier;
a first catalyst layer loaded on said carrier, said first catalyst layer comprising a catalyst composition containing at least one noble metal selected from the group consisting of Pt and Pd, and active alumina, said catalyst composition maintaining a specific surface area of not less than 50 m²/g and a porosity of not less than 50% after the catalyst composition is held at 1,000° C. for 20 hours in air; and
a second catalyst layer loaded on said first catalyst layer, said second catalyst layer comprising a second catalyst composition containing active alumina and Rh loaded thereon, wherein said second catalyst composition maintains a specific surface area of not less than 50 m²/g and a porosity of not less than 50% after the catalyst composition is held at 1,000° C. for 20 hours in air.

12. The catalyst of claim 11, wherein said catalyst composition further contains a rare earth oxide.

13. The catalyst of claim 11, wherein said heat-resistant inorganic carrier is a monolith.

14. The catalyst of claim 11, wherein said catalyst composition is produced by:

hydrolyzing an aluminum salt or an aluminum alkoxide derivative to obtain an alumina precursor sol or gel;

drying said sol or gel under a supercritical temperature and pressure to obtain an alumina porous material;

firing the material at a temperature of not less than 500° C. to obtain active alumina; and adding at least one noble metal selected from the group consisting of Pt, Pd and Rh to said active alumina to obtain said catalyst composition.

15. A process for producing a catalyst for exhaust gas purification, comprising the steps of:

hydrolyzing an aluminum salt or an aluminum alkoxide derivative to obtain an alumina precursor sol or gel;

drying said sol or gel under a supercritical temperature and pressure to obtain an alumina porous material;

firing the material at a temperature of not less than 500° C. to obtain active alumina;

adding at least one noble metal selected from the group consisting of Pt, Pd and Rh to said active alumina to obtain a catalyst composition; and forming a catalyst layer containing said catalyst composition on a heat-resistant inorganic carrier, wherein said catalyst composition maintains a specific surface area of not less than 50 m$^2$/g and a porosity of not less than 50% after the catalyst composition is held at 1,000° C. for 20 hours in air.

16. The process of claim 15, further comprising the step of adding a rare earth component to said active alumina.

17. The process of claim 15, wherein said heat-resistant carrier is a monolith.

18. The process of claim 15, wherein the material is fired at a temperature of not less than 800° C.

19. The process of claim 15, wherein the material is fired at a temperature of not less than 1,000° C.

20. The A process for producing a catalyst for exhaust gas purification, comprising the steps of:

forming a noble-dispersed alumina precursor sol or gel by adding at least one noble metal selected form the group consisting of Pt, Pd and Rh to an aluminum salt or aluminum alkoxide derivative;

drying said sol or gel under a supercritical temperature and pressure to obtain a noble metal-dispersed alumina porous material;

firing the material at a temperature of not less than 500° C. to obtain an noble metal-dispersed active alumina, thereby forming a catalyst composition; and forming a catalyst layer containing the catalyst composition on a heat-resistant inorganic carrier, wherein said catalyst composition maintains a specific surface area of not less than 50 m$^2$/g and a porosity of not less than 50% after the catalyst composition is held at 1,000° C. for 20 hours in air.

21. The process of claim 20, further comprising the step of adding a rare earth component to the noble metal-dispersed active alumina.

22. The process of claim 20, wherein said heat-resistant carrier is a monolith.

23. The process of claim 20, wherein the material is fired at a temperature of not less than 800° C.

24. The process of claim 20, wherein the material is fired at a temperature of not less than 1,000° C.

25. A process for producing a catalyst for exhaust gas purification, comprising the steps of:

forming an alumina-rare earth composite precursor sol or gel by adding a rare earth component to an aluminum salt or an aluminum alkoxide derivative;

drying said sol or gel under a supercritical temperature and pressure to obtain an alumina rare-earth composite porous material;

adding at least one noble metal selected from the group consisting of Pt, Pd and Rh to the material to obtain a catalyst composition; and forming a catalyst layer containing the catalyst composition on a heat-resistant inorganic carrier, wherein said catalyst composition maintains a specific surface area of not less than 50 m$^2$/g and a porosity of not less than 50% after the catalyst composition is held at 1,000° C. for 20 hours in air.

26. The process of claim 25, further comprising the step of adding a rare earth component to the alumina-rare earth composite porous material.

27. The process of claim 25, wherein said heat-resistant carrier is a monolith.

28. A process for producing a catalyst for exhaust gas purification, comprising the steps of:

forming an alumina-rare earth composite precursor sol or gel by adding a rare earth component to an aluminum salt or an aluminum alkoxide derivative;

drying the sol or gel under a supercritical temperature and pressure to obtain an alumina-rare earth composite porous material;

firing the material at a temperature of not less than 500° C. to obtain an active alumina-rare earth composite;

adding at least one noble metal from the group consisting of Pt, Pd and Rh to the composite to obtain a catalyst composition; and forming a catalyst layer containing the catalyst composition on a heat-resistant inorganic carrier, wherein said catalyst composition maintains a specific surface area of not less than 50 m$^2$/g and a porosity of not less than 50% after the catalyst composition is held at 1,000° C. for 20 hours in air.

29. The process of claim 28, further comprising the step of adding a rare earth component to the active alumina-rare earth composite.

30. The process of claim 28, wherein said heat-resistant carrier is a monolith.

31. The process of claim 28, wherein the material is fired at a temperature of not less than 800° C.

32. The process of claim 28, wherein the material is fired at a temperature of not less than 1,000° C.

33. A process for producing a catalyst or exhaust gas purification, comprising the steps of:

forming a noble metal-dispersed alumina-rare earth composite precursor sol or gel by adding a rare earth component and at least one noble metal selected from the group consisting of Pt, Pd and Rh to an aluminum salt or aluminum alkoxide;

drying the sol or gel under a supercritical temperature and pressure to obtain a noble metal-dispersed alumina-rare earth composite porous material;

firing the material at a temperature of not less than 500° C. to obtain a catalyst composition; and forming a catalyst layer containing the catalyst composition on a heat-resistant inorganic carrier, wherein said catalyst composition maintains a specific surface area of not less than 50 m$^2$/g and a porosity of not less than 50% after the catalyst composition is held at 1,000° C. for 20 hours in air.

34. The process of claim 33, further comprising the step of adding a rare earth component to the catalyst composition.

35. The process of claim 33, wherein said heat-resistant carrier is a monolith.

36. The process of claim 33, wherein the material is fired at a temperature of not less than 800° C.

37. The process of claim 33, wherein the material is fired at a temperature of not less than 1,000° C.

* * * * *